Aug. 28, 1923.
H. E. ALTGELT
1,466,202
CLUTCH MECHANISM FOR POWER LIFTS
Filed June 6, 1921      3 Sheets-Sheet 3
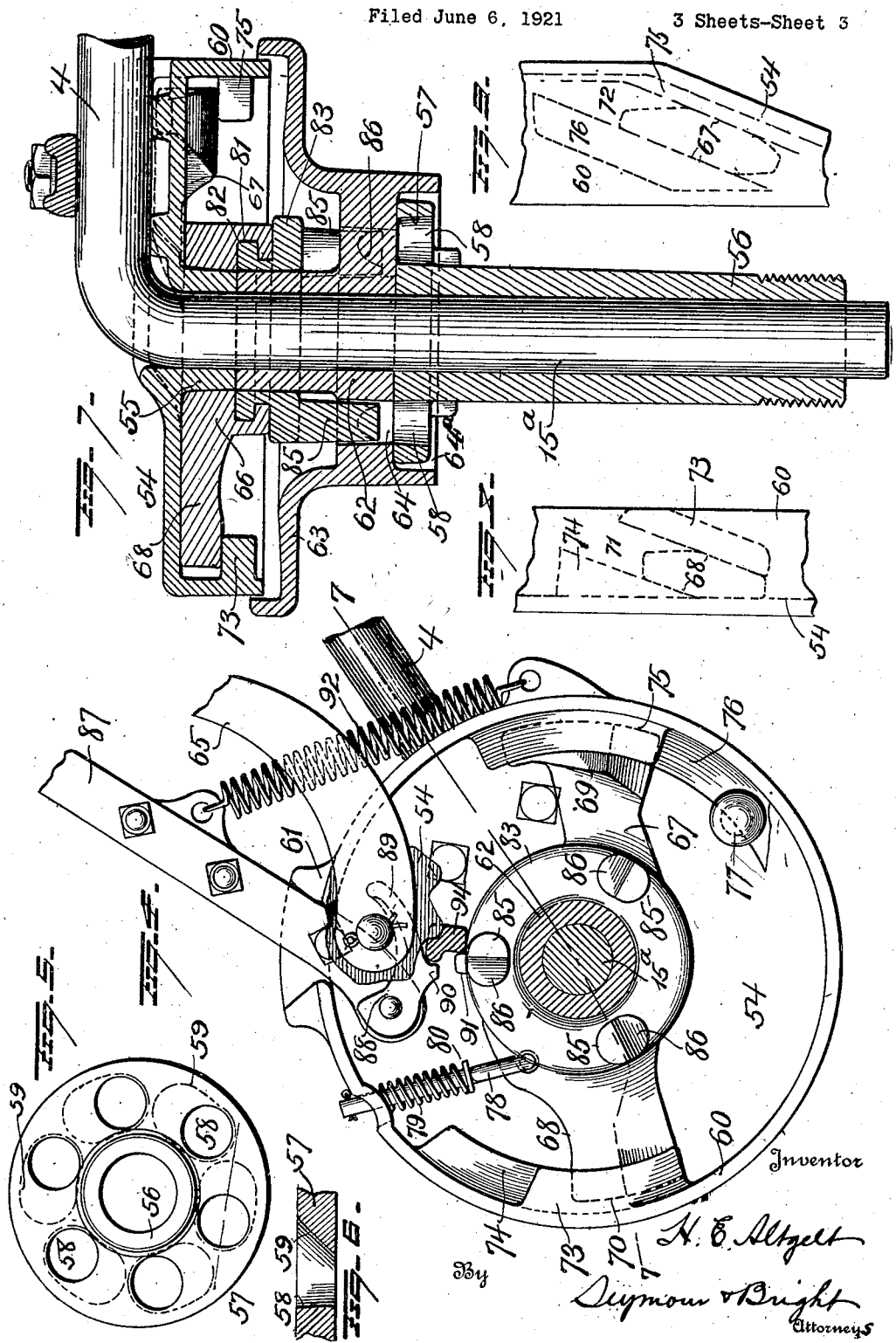

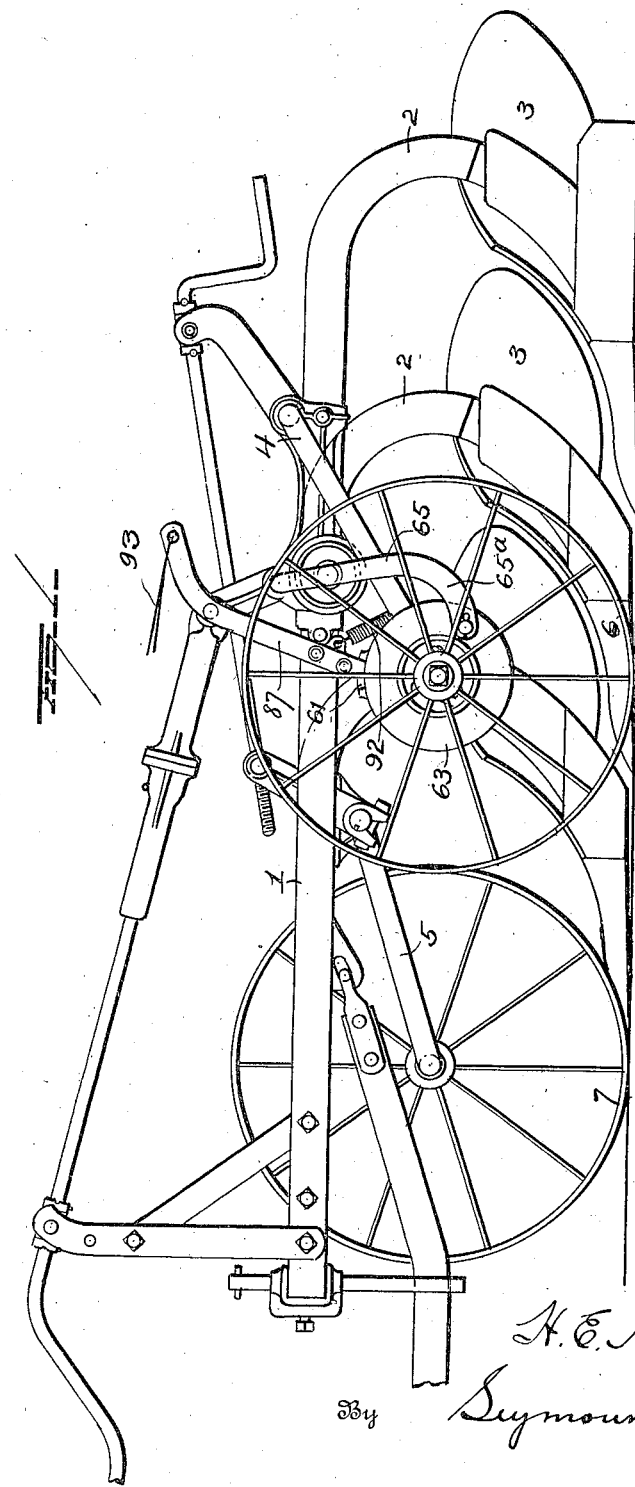

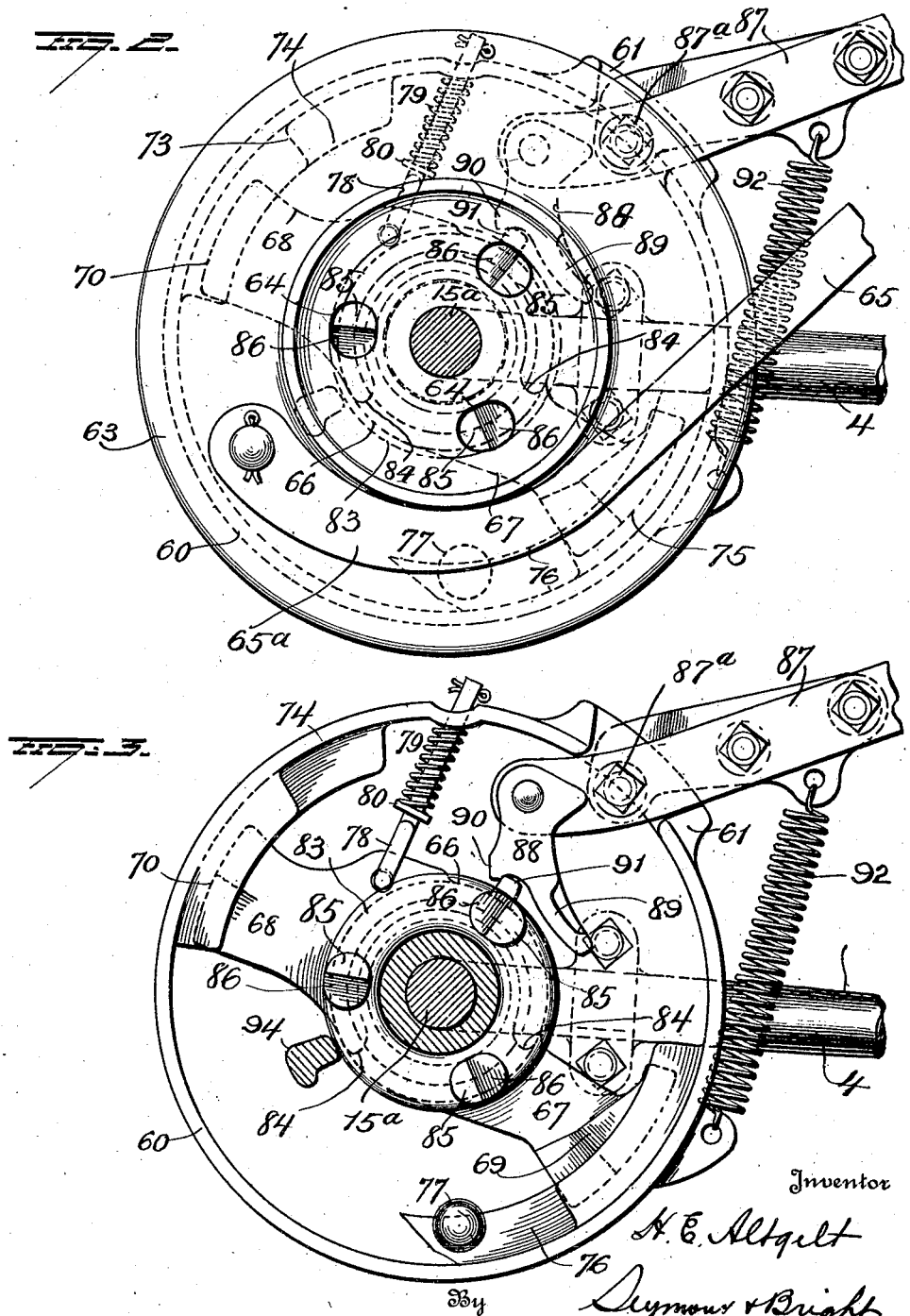

Patented Aug. 28, 1923.

1,466,202

UNITED STATES PATENT OFFICE.

HERMAN E. ALTGELT, OF SOUTH BEND, INDIANA, ASSIGNOR TO OLIVER CHILLED PLOW WORKS, OF SOUTH BEND, INDIANA.

CLUTCH MECHANISM FOR POWER LIFTS.

Application filed June 6, 1921. Serial No. 475,294.

*To all whom it may concern:*

Be it known that I, HERMAN E. ALTGELT, a citizen of the United States, and a resident of South Bend, in the county of St. Joseph and State of Indiana, have invented certain new and useful Improvements in Clutch Mechanism for Power Lifts; and I do hereby declare the following to be a full, clear, and exact description of the invention, such as will enable others skilled in the art to which it appertains to make and use the same.

This invention relates to improvements in clutch mechanism and more particularly to such as is adaptable for use with power lift mechanism for plows and the like,—one object of the invention being to provide simple, efficient and durable means for coupling power lift devices with and disconnecting the same from a part rotatable with one of the wheels of the plow.

A further object is to so construct the clutch or coupling mechanism that a member thereof may be automatically released from the driving member when the latter is turned backwardly, to facilitate disconnection of the power lift devices from the wheel of a plow after one or more plow bases shall have met an obstruction and after the lifting mechanism shall have been connected with said wheel.

With these and other objects in view, the invention consists in certain novel features of construction and combination of parts as hereinafter set forth and pointed out in the claims.

In the accompanying drawings, Figure 1 is a view illustrating an application of my improvements. Figure 2 is an enlarged view showing the positions of the clutch or coupling and lifting devices when the plow is in working position. Figure 3 is a similar view with the lifting disk and lifting arm removed. Figure 4 is a view showing the positions of the clutch or coupling devices and lifting devices after the plow shall have been raised. Figures 5 and 6 are views illustrating the shape of the holes 58 in the part 57. Figure 7 is a sectional view on the line 7—7 of Fig. 4 showing the clutch or coupling devices and the manner in which the same may operate to couple the lifting disk with the carrying wheel and uncoupling the same therefrom, and Figures 8 and 9 are fragmentary views illustrating the cam devices of the clutch or coupling mechanism.

To exemplify an application of my improvements, I have shown in Figure 1 of the drawings, a plow frame 1 comprising beams provided with standard portions 2 for attachment of plow bases 3, and said frame is connected, through the medium of crank-axles 4—5 with land and furrow wheels 6 and 7.

A housing 54 is rigidly secured to the crank of the axle 4 near the juncture of the spindle portion 15$^a$ with said crank and is provided with a central hub 55 through which said spindle portion passes. The axle spindle 15$^a$ also passes through a wheel box 56 in the hub of the land wheel 6 and said wheel box is provided at its inner end with an annular flange 57 having a plurality of holes 58,—each of which may be somewhat oval and made at one end with a beveled wall 59. The housing 54 may comprise a circular disk having a peripheral flange 60, the latter being notched and reinforced as at 61 for a purpose hereinafter explained.

The hub 62 of an oscillatory lifting disk or member 63 is mounted to turn freely on the spindle 15$^a$ and the inner end of this hub may abut against the outer end of the hub 55 in the housing 54. The lifting disk 63 is provided, around the hub portion thereof with a series of holes 64 and the central portion of said lifting disk is provided with an annular recess 64$^a$ into which the perforated flange 57 of the wheel box 56 enters. A lifting arm 65 connected with the plow frame is provided with a curved lower portion 65$^a$ pivotally connected with the disk 63 so that when the latter is turned approximately three-quarters of a single revolution in one direction, motion will be imparted to the plow frame to raise the same.

A ring 66 is mounted loosely on the hub 55 in the housing 54 and is provided with diametrically opposite arms 67, 68, having end portions 69, 70 which are beveled and movable near the peripheral flange 60 of the housing when said ring is turned. The beveled end portions of the arms 67, 68 are adapted to move in cam-ways 71, 72, formed by pairs of cam-flanges 73—74 and 75—76 located diametrically opposite each other and may be cast with the disk and peripheral flange of said housing. The beveled flanges 74 and 76 may project beyond one end of the adjacent flanges 73 and 75 and at one end of the flange 76, a stop 77 may be located to be engaged by the part 69 of arm 67 and limit the extent to which the ring 66 and arms 67—68 may be moved in one direction,—turning movement of said ring and arms in the other direction being limited by engagement of said ring and its arms with the disk portion of the housing. A rod 78 is pivoted to one of the arms, (preferably the arm 68) and passes freely through a hole in the flange 60 of the housing and a spring 79 encircling this rod bears at one end against the housing flange 60 and at the other end against a collar 80 on the rod,—these devices serving as means to retain the collar 66 and the parts co-operable therewith, in the position to which they may be moved.

The ring 66 is made interiorly with a groove 81, in which an annular flange 82 on a ring 83 is rotatably mounted, said ring being also made with a cut-away portion 84 to permit the assembling of the ring. The ring 83 is provided with a plurality of pins 85 (three such pins being shown in the drawing), which project outwardly and enter holes 64 in lifting member or disk 63, and each of said pins is made with a beveled face 86 for a purpose hereinafter explained.

It is evident that if the ring 66 be turned in one direction, the outer end portions of the arms 67—68 will move in the cam-ways 71—72 and so co-operate with the cam-flanges as to cause said ring to be moved also in a direction parallel with its axis and cause the pins 85 carried by the ring 83 to be projected through the holes 64 in the lifting disk 63 and made to enter three of the holes 58 in the annular flange 57 of the wheel box 56, and thus the lifting disk 63 will be coupled to the land wheel so as to rotate therewith and cause the plow frame to be raised through the medium of the lifting arm 65.

A control lever 87 is pivoted by a pin 87ª to the housing 54 and passes through the notched portion 61 thereof. The short arm of this lever enters the housing and has pivoted thereto, a gravity dog 88 having a tongue 89 and also a tooth 90, the latter being intended to engage a rib 91 on the periphery of the ring 66. The control lever is maintained normally in and returned to normal position by a spring 92 attached to said lever and to the housing 54 and to said lever, an operating cord 93 may be attached. The lifting disk or member 63 is provided with an inwardly projecting lug 94 adapted to co-operate with the rib 91 on the ring 66, for a purpose hereinafter explained.

When the plow is in working position, the parts of the clutch and lifting mechanisms will assume the postions shown in Figure 2, with the connection of the lifting arm 65 with the lifting disk 63 located approximately in front of the axis of said disk when the plow is adjusted for deep plowing. To cause the plow to be raised by power from the land wheel, the operator will pull the cord 93 to move the control lever forwardly. This will cause the dog 88 to move rearwardly and, by engagement with the rib 91 cause the ring to be turned and the lifting disk to be coupled with the land wheel so that the rotation of the latter will cause the plow frame to be raised as previously explained. During the raising operation, the pivotal connection of the lifting arm to the lifting disk will move from the position shown in Figure 2 to the position shown in Figure 4, thus moving during approximately three-fourths of a rotation of the lifting disk. During the raising of the plow, the crank of the axle 4 will move from the position shown in Figure 2 to the position shown in Figure 4 and as the pivotal connection of the lifting arm with the lifting disk approaches a position slightly past a dead center over and with relation to the axis of said disk, (whereby the plow will be held in raised position) the lug 94 on said disk will engage the tongue 89 of the dog 88, raise the latter and engage the rib 91 on the ring 66, thus cause the latter to be turned (overcoming the resistance of the spring 79) and causing said ring to move inwardly by the co-operation of the arms on said ring with the cams and the pins will be withdrawn from the wheel box, thus uncoupling the lifting disk from the land wheel and leaving the plow in its raised position. To permit the plow to descend to working position, the operator will again move the control lever forwardly, causing the dog 88 to engage the lug 94 on the disk and turn said disk sufficiently to move the pivotal connection of the lifting arm with said disk past the dead center, when the plow frame will descend by gravity and the disk will be turned backwardly.

Should one of the plow bases encounter an impassable obstruction, the inclination of the operator would be to operate the clutch or coupling devices to cause the plow to be raised. Under such conditions, the plow frame could not be raised by power from the land wheel because the plow could not move forwardly. By backing the plow away from the obstruction, the backward turning of the land wheel will cause the beveled walls 59 of the holes 58 in the flange 57 of the wheel box to co-operate with the beveled portions 86 of the pins 85 and cause the latter, by cam action, to be forced backwardly and effect the uncoupling of the lifting devices from the wheel. The power lift mechanism may now be thrown into operation to raise the plow frame and pass the obstruction as the plow travels forwardly.

Having fully described my invention what I claim as new and desire to secure by Letters-Patent, is:

1. In mechanism of the character described, the combination with a driving member and a driven member, of coupling mechanism comprising a support provided with a central fixed hub, a ring revoluble on said hub and provided with radial arms, cams rigid with said support and with which the free end portions of said arms cooperate to cause movement of said ring in a direction parallel with its axis, said cams being also concentric to the axis of said ring, and engaging means connected with said ring to cooperate with the driving member, and control means for said coupling devices.

2. In mechanism of the character described, the combination with a driving member and a driven member, of coupling mechanism comprising a support provided with a central fixed hub, a ring revoluble on said hub and provided with radial arms, cams rigid with said support and with which the free end portions of said arms cooperate to cause movement of said ring in a direction parallel with its axis, said cams being also concentric to the axis of said ring, engaging means connected with said ring to cooperate with the driving member, and means whereby the engaging means may be forced out of engagement with the driving member against resistance of the cams, when the driving member is rotated backwardly, and control means for said coupling devices.

3. In mechanism of the character described, the combination with a support and a driven member, of a driving member having holes, one end of each of which has a beveled wall, a plurality of pins, each having a beveled portion, a carrier for said pins, cam devices carried by said support for moving said carrier and pins whereby said pins may be moved through holes in the driven member and enter the holes in the driving member, the beveled portion of the holes in the driving member being cooperable with the beveled portions of said pins when the driving member is turned backwardly to force said pins out of engagement with the driving member and thus disconnect the driven member therefrom, and control means for said cam devices.

In testimony whereof, I have signed this specification in the presence of two subscribing witnesses.

HERMAN E. ALTGELT.

Witnesses:
ROSE B. MARBAUGH,
JENNIE M. DAVIS.